US010451161B2

(12) United States Patent
Garcia et al.

(10) Patent No.: US 10,451,161 B2
(45) Date of Patent: Oct. 22, 2019

(54) ELECTRONIC LOCKING DIFFERENTIAL

(71) Applicant: Ford Global Technologies, LLC, Dearborn, MI (US)

(72) Inventors: Gustavo Luis Garcia, Canton, MI (US); Jacob Martin Povirk, Franklin, MI (US); Jihong Guo, Ann Arbor, MI (US); Filip Tomik, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 114 days.

(21) Appl. No.: 15/804,173

(22) Filed: Nov. 6, 2017

(65) Prior Publication Data

US 2019/0136952 A1 May 9, 2019

(51) Int. Cl.
*F16H 48/34* (2012.01)
*F16H 48/24* (2006.01)
*F16H 48/20* (2012.01)
*B62D 15/02* (2006.01)

(52) U.S. Cl.
CPC ........... *F16H 48/34* (2013.01); *B62D 15/029* (2013.01); *F16H 48/24* (2013.01); *F16H 2048/205* (2013.01)

(58) Field of Classification Search
CPC .... F16H 48/34; F16H 48/24; F16H 2048/205; B62D 15/029; B60W 2520/14; B60W 2520/28
See application file for complete search history.

(56) References Cited

U.S. PATENT DOCUMENTS

| 4,671,373 | A |   | 6/1987  | Sigl |
|-----------|---|---|---------|------|
| 5,695,022 | A | * | 12/1997 | Zalewski ............. B60K 17/344 180/197 |
| 5,853,342 | A | * | 12/1998 | Pritchard ........... B60K 17/3462 475/206 |
| 6,038,506 | A |   | 3/2000  | Dickhans et al. |
| 6,167,354 | A |   | 12/2000 | Maleki et al. |
| 6,755,763 | B1 | * | 6/2004 | Goto ....................... F16H 48/08 192/35 |
| 7,969,326 | B2 | * | 6/2011 | Sakakibara ........ B62D 15/0275 340/932.2 |
| 8,265,842 | B2 | * | 9/2012 | Povirk ................... B60K 23/04 475/157 |
| 9,333,965 | B2 |   | 5/2016 | Marsh et al. |
| 9,605,740 | B2 | * | 3/2017 | Povirk ................. B60K 17/344 |
| 2005/0279562 | A1 | * | 12/2005 | Hara ..................... B62D 1/163 180/402 |
| 2006/0122032 | A1 |   | 6/2006 | Heier et al. |
| 2006/0175113 | A1 | * | 8/2006 | Rodeghiero ....... B60K 23/0808 180/249 |
| 2007/0184929 | A1 |   | 8/2007 | Piyabongkam et al. |

(Continued)

*Primary Examiner* — Tinh T Dang
(74) *Attorney, Agent, or Firm* — David Kelley; Brooks Kushman P.C.

(57) ABSTRACT

A vehicle includes a differential having an electronic locker and a controller. The controller is programmed to, when in differential-lock mode, engage the locker responsive to vehicle speed being less than a speed threshold and a steering angle being less than a threshold, disengage the locker responsive to vehicle speed exceeding the speed threshold, and prevent automatic re-engagement of the locker responsive to the steering angle exceeding the threshold.

16 Claims, 4 Drawing Sheets

(56) References Cited

U.S. PATENT DOCUMENTS

| | | | |
|---|---|---|---|
| 2007/0250236 A1* | 10/2007 | Newberry | B60K 23/04 |
| | | | 701/51 |
| 2008/0090688 A1 | 4/2008 | Torres et al. | |
| 2011/0082634 A1* | 4/2011 | Povirk | B60K 17/344 |
| | | | 701/88 |
| 2011/0269595 A1* | 11/2011 | Marsh | F16H 48/30 |
| | | | 475/220 |
| 2016/0101770 A1* | 4/2016 | Yamazaki | B60W 10/02 |
| | | | 701/99 |
| 2016/0194002 A1 | 7/2016 | Kelly | |

* cited by examiner

ELECTRONIC LOCKING DIFFERENTIAL

TECHNICAL FIELD

The present disclosure relates to electronic locking differentials and more specifically to controls for controlling locking and unlocking of the differential during certain operating conditions to prevent hardware damage to the differential.

BACKGROUND

Motor vehicles may include a differential on the drive axle to transmit torque produced by an engine to driven wheels of the vehicle. The differential allows the driven wheels to rotate at different speeds relative to each other. This allows the outer wheel to rotate faster than the inner wheel when the vehicle is turning.

A typical open differential includes a ring gear meshing with a pinion gear that is fixed to a driveshaft. A differential case is fixed to the ring gear and is supported for rotation within a housing of the differential. The case supports a pair of side gears and a pair of spider gears in meshing engagement with the side gears. The side gears are driveably connected to the driven wheels. The spider gears transmit torque from the case to the side gears to propel the vehicle. Open differentials have difficulty propelling the vehicle when one of the driven wheels is on a low-traction surface as torque from the engine is routed to the low-traction wheel resulting is wheel spin.

Limited-slip differentials were developed to overcome the drawbacks of open differentials. Typical limited-slip differentials include a clutch pack and a spring that cooperate to engage a side gear, associated with the higher-traction wheel, with the case to provide engine torque to both driven wheels.

A locking differential includes a locking mechanism configured to rotationally lock the side gears relative to each other so that the left and right driven wheels rotate in unison. Unlike limited-slip differentials, which rely on wheel spin to compress the clutch pack, locking differentials include a locker that mechanically locks the half shafts for unison rotation. The locker may be manually or electronically engaged. This type of differential is commonly employed on pickup trucks and sport utility vehicles to improve off-road capabilities.

SUMMARY

According to one embodiment, a vehicle includes a differential having an electronic locker and a controller. The controller is programmed to, when in differential-lock mode, engage the locker responsive to vehicle speed being less than a speed threshold and a parameter indicative of steering angle being less than a threshold, disengage the locker responsive to vehicle speed exceeding the speed threshold, and prevent automatic re-engagement of the locker responsive to the parameter exceeding the threshold.

According to another embodiment, a vehicle includes a differential having an electronic locker and a controller. The controller is programmed to, responsive to the locker being engaged and vehicle speed exceeding a speed threshold, command disengagement of the locker. The controller is further programmed to, responsive to the locker being disengaged, differential-lock mode being requested, vehicle speed being below the speed threshold, and a parameter indicative of a steering angle exceeding a threshold, prevent automatic re-engagement of the locker.

According to yet another embodiment, a method of controlling an electronic-locking differential includes disengaging the electronic-locking differential responsive to the differential being engaged and vehicle speed exceeding a speed threshold. The method further includes preventing automatic re-engagement of the differential responsive to the differential being disengaged, differential-lock mode being requested, vehicle speed being below the speed threshold, and a parameter indicative of steering angle exceeding a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
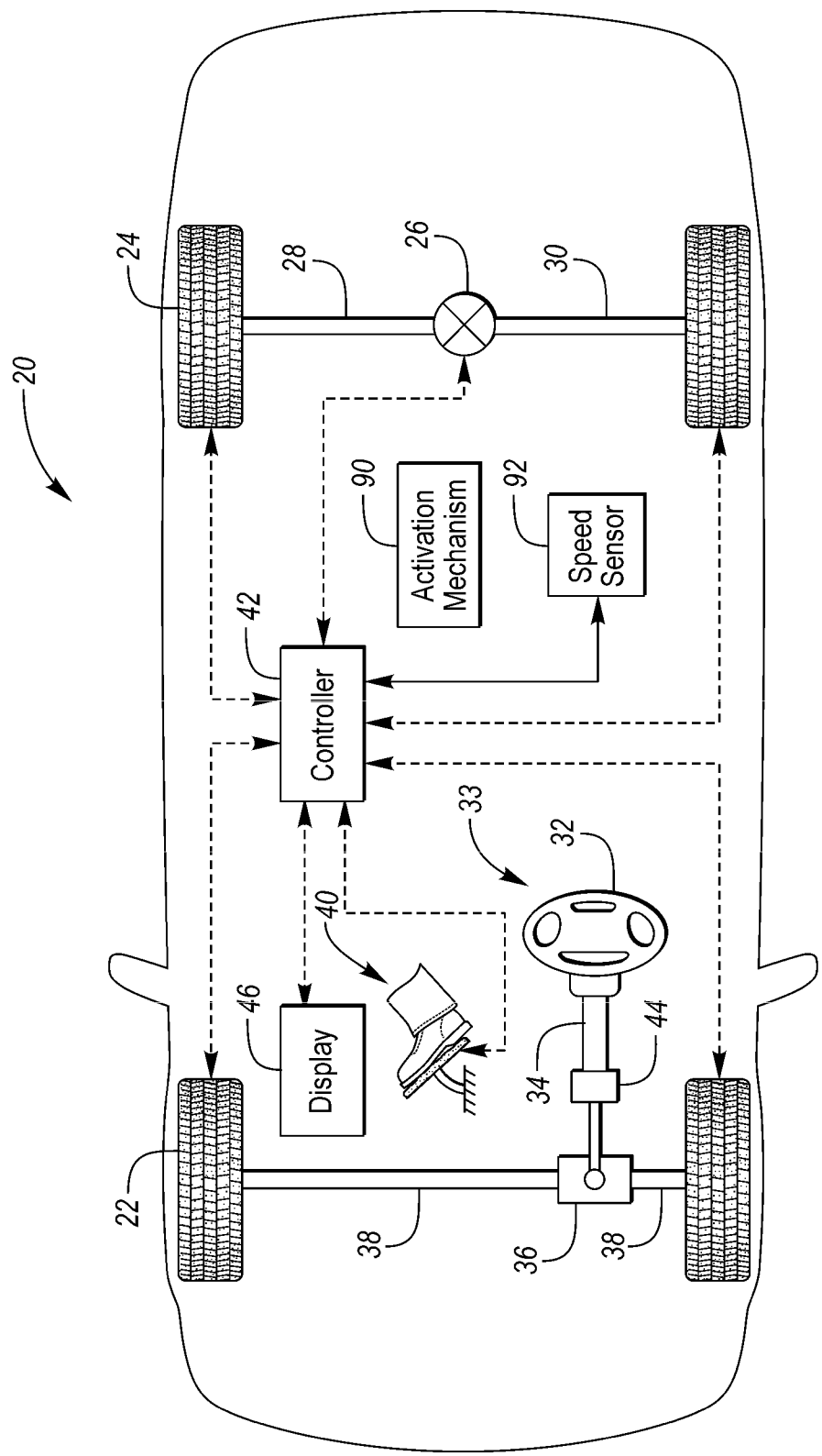
FIG. 1 is a schematic diagram of a vehicle including a controller and a differential according to one or more embodiments of this disclosure.

Referring to FIG. 1, a vehicle 20 includes front wheels 22 and rear wheels 24. In the illustrated embodiment, the vehicle is rear-wheel drive and the rear wheels 24 are powered by a powertrain including an engine, an electric motor, or combinations thereof. A driveshaft (not shown) may transmit power produced by the powertrain to the rear wheels 24 via a differential 26 and left and right half shafts 28, 30. An accelerator pedal 40 allows the driver of the vehicle 20 to control the power output of the powertrain. The vehicle 20 could also be front-wheel drive, all-wheel drive, or four-wheel-drive, in which case, the front wheels may include an associated differential.

The vehicle 20 also includes a steering system that turns the front wheels 22. The illustrated rack-and-pinion steering system 33 may include a steering wheel 32 that rotates a steering shaft 34. Rotation of the steering shaft 34 is transmitted to the front wheels 22 via a steering rack 36 and tie rods 38 to turn the wheels 22 in response to rotation of the steering wheel 32. For example, the steering system may be hydraulic, electric, or combinations thereof. If the steering system 33 is electric, the steering shaft may or may not be included. In another embodiment, the steering system may include wheel motors that actuate the wheels or a linear actuator as opposed to a rack-and-pinion arrangement. Other types of steering systems are known and may be used in the vehicle 20.

The vehicle 20 includes a controller 42. While illustrated as one controller, the controller 42 may be part of a larger control system and may be controlled by various other controllers throughout the vehicle 20, such as a vehicle system controller (VSC). It is to be understood that the controller 42 and one or more other controllers can collectively be referred to as a "controller" that controls various actuators in response to signals from various sensors to control functions such as operating the powertrain, the front wheels 22, the rear wheels 24, the steering system 33, and the differential 26 for example. Any reference in the claims to "a controller" refers to one or more controllers. The controller 42 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 42 communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. In the illustrated embodiment, each of the wheels includes a wheel-speed sensor that is in communication with the controller 42. Each wheel-speed sensor outputs a signal indicative of rotational speed of that wheel. The wheel-speed sensors may be utilized in controlling an anti-lock braking system (ABS), a traction control system, and/or a stability control system. The steering system 33 is also in electronic communication with the controller 42 to provide a parameter to the controller 42 that is indicative of a steering angle. For example, the steering shaft 34 may include an associated sensor 44 that measures rotation of the steering shaft 34 and outputs a signal indicative of an angle of the steering shaft 34, or the steering rack 36 may include components, e.g., sensor or electric actuator, that output a signal. The controller may include programming that translates the signal into a steering angle that may be used by other programming of the controller. Alternatively, signals from other electrical components or sensors of the steering system may be used by the controller as a parameter indicative of steering angle.

The accelerator pedal 40 may include a sensor that measures actuation of the pedal 40 and outputs a signal indicative of accelerator-pedal position to the controller 42. The controller 42 may use the pedal-position signal to operate the differential 26 as will be explained in more detail below. The vehicle 20 may include a display 46 such as a touchscreen radio head. The display 46 is configured to display information to occupants of the vehicle 20 and may include capacitive-touch elements allowing the driver to provide information to the controller 42.

The differential 26 is an electronic locking differential that is in communication with the controller 42. The differential 26 includes an electronically actuated locker configured to lock the left and right half shafts 28 and 30 relative to each other when engaged and permit relative rotation between the half shafts 28 and 30 when disengaged. The locker is in communication with the controller 42 and locks the differential 26 in response to a command from the controller 42.

Figure 2:
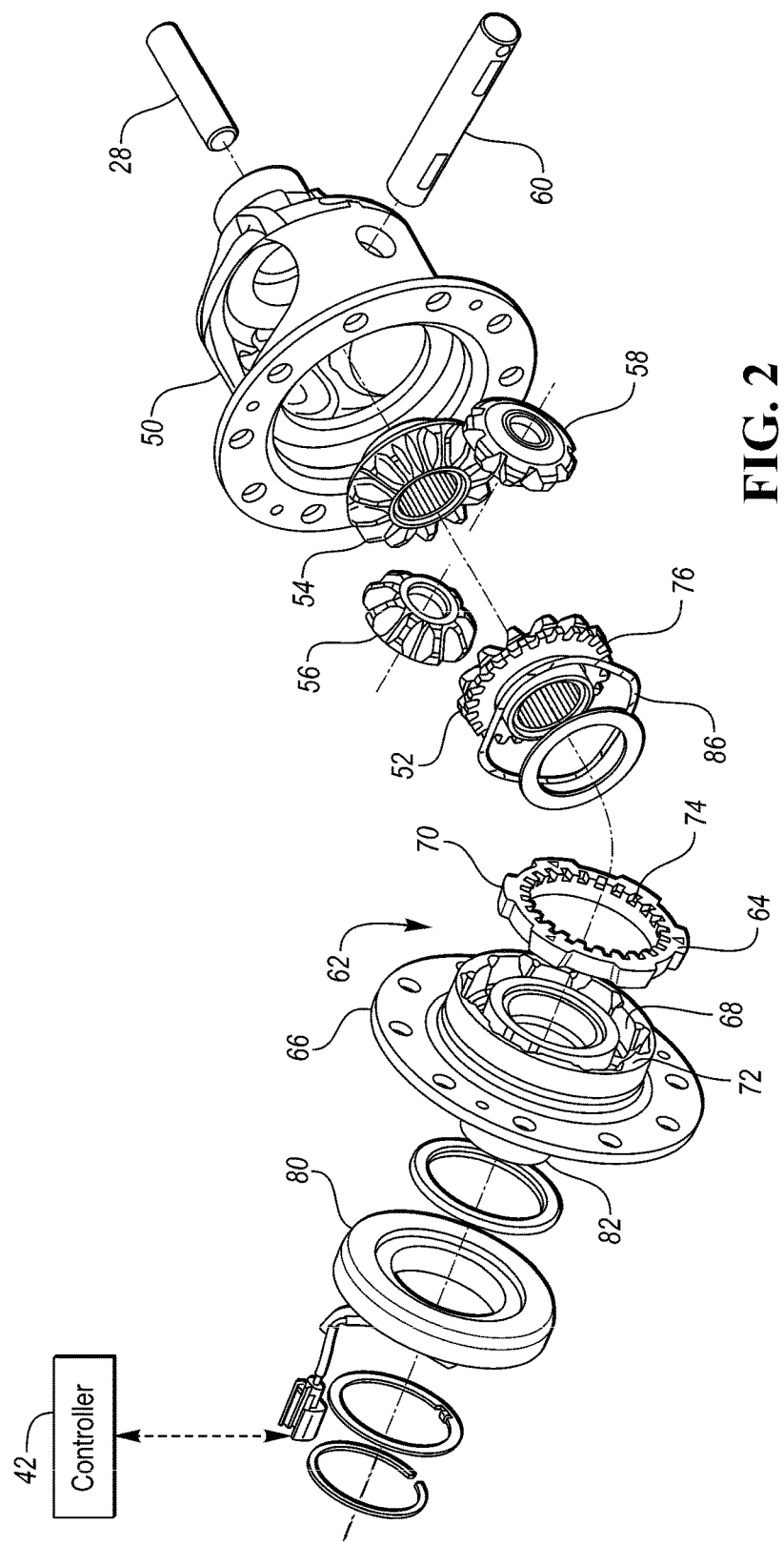
FIG. 2 is an exploded view of the differential of FIG. 1.
Figure 3:
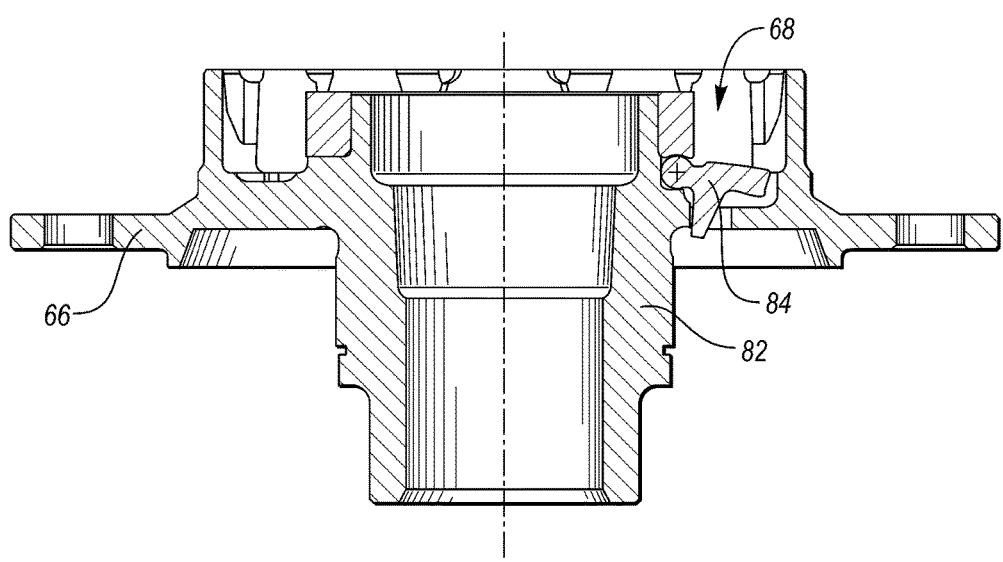
FIG. 3 is a cross-sectional view of the differential along cut line 3-3.

Many types of electronic locking differential are known and FIGS. 2 and 3 merely illustrate one example differential 26 that may be used in the vehicle 20. The differential 26 includes a housing (not shown) and a case 50 disposed within the housing. The case 50 is supported for rotation within the housing and is configured to receive power from the powertrain. The case 50 may support a pair of opposing first and second side gears 52, 54 and a pair of opposing first and second spider gears 56, 58 in meshing engagement with the side gears. A shaft 60 may interconnect the spider gears 56, 58. The first side gear 52 is configured to transmit torque to the left half shaft 30, and the second side gear 54 is configured to transmit torque to the right half shaft 28. The half shafts may be splined to the side gears.

The electronic locking differential 26 has an unlocked state (disengaged) in which the half shafts 28, 30 are permitted to rotate independent of each other, and a locked state (engaged) in which the half shafts are rotationally fixed to each other. The differential 26 may be placed in the locked state by fixing one of the side gears 52, 54 to the case 50 via an electronically actuated mechanism. This mechanism is commonly referred to as a locker.

The differential 26 includes an electronically controlled locker 62 configured to fix the side gear 52 to the case 50 when energized. In the illustrated embodiment, the locker 62 is a dog clutch. The locker 62 may include a locking ring 64 supported by an end cap 66. The end cap 66 is mounted to the case 50. The end cap 66 defines a receiving area 68 that receives the locking ring 64. The locking ring 64 defines arms 70 configured to engage with posts 72 of the end cap 66 to prevent rotation of the locking ring 64 relative to the case 50 while allowing axial movement of the locking ring 64 relative to the side gear 52. The locking ring 64 defines teeth 74 configured to engage with teeth 76 formed on a backside of the side gear 52. The differential 26 is locked by axially sliding the locking ring 64 into engagement with the side gear 52, which fixes the side gear 52 to the case 50. An electric coil 80 slides the locking ring 64 into the side gear 52. The electric coil 80 is disposed on a back hub 82 of the end cap 66 adjacent to the locking ring 64. When energized, the electric coil 80 is magnetically attracted to the case 50 and slides into engagement with levers 84 supported within the end cap 66. The coil 80 rotates the levers 84, which in turn, slide the locking ring 64 towards the side gear 52 until the teeth 74 and 76 mesh. The differential 26 is unlocked by de-energizing the electric coil 80. A wave spring 86 may be used to urge the locking ring 64 away from the side gear 52 when the coil 80 is de-energized.

In order for the locker 62 to lock, the teeth 76 of the side gear 52 and the teeth 74 of the locking ring 64 must intermesh. The locker 62 relies on the contact between the teeth 74, 76 to synchronize speeds of the side gear 52 and the locking ring 64 so that the teeth can fully engage. This occurs more easily when the rotational speed difference (differentiation) between the locking ring 64 and the side gear 52 is below a threshold and low or no torque is being transferred between the locking ring 64 and the side gear 52. Excessive torque or speed differentiation can cause ratcheting during engagement. Ratcheting creates wear on the teeth 74, 76, which reduces the life of the differential 26.

Vehicles equipped with electronic locking differentials typically include controls for monitoring vehicle speed and engine torque so that locking of the differential is not commanded when the vehicle speed or the torque of the powertrain exceeds a threshold. These typical checks, however, may be insufficient to prevent ratcheting in all operating conditions of the vehicle.

Referring back to FIG. 1, the vehicle 20 includes an activation mechanism 90 used by the driver in order to request locking of the differential 26. The activation mechanism is located in the passenger compartment such as on the dashboard. The activation mechanism 90 may be a button, a switch, a knob, a toggle, or capacitive touch element of the display 46. The activation mechanism 90 is in electronic communication with the controller 42 and is configured output a differential-lock signal. The controller 42 is programmed to receive the differential-lock signal and set a flag. The controller 42 is further programmed to attempt to lock the differential whenever the flag is present, but will only issue an engagement command to the locker 64 when prerequisite vehicle operating conditions are verified. For example, the controller 42 will command the differential 26 to lock in response to a flag being present, and the vehicle speed being less than a threshold, the pedal 40 being depressed less than a threshold, and the steering angle being less than a threshold. The controller 42 is also programmed to automatically unlock the differential 26, despite the flag being present, if the vehicle speed exceeds a threshold such as 25 mile per hour (mph). (The speed threshold may be higher or lower than 25 mph. For example, the speed threshold may be between 15 and 30 miles per hour, inclusive.) If the differential 26 is unlocked due to excessive vehicle speed, the controller is programmed to re-engage the locker 62 once the speed drops below the threshold if the flag is present and the other locking conditions are satisfied.

The differential 26 is especially prone to ratcheting during an automatic re-engagement of the locker 62 due to the vehicle speed cycling above and below the threshold. Speed cycling typically occurs at turns where a driver decelerates to negotiate the turn and subsequently accelerates on exit. While the vehicle is slowing for a turn, the vehicle speed and accelerator-pedal conditions are typically below their respective thresholds. Thus, the vehicle 20 relies on steering-angle monitoring to prevent activation of the locker 62 during a turn, which may cause ratcheting of the dog clutch.

In addition to vehicle speed, the controller 42 may also be programmed to de-energize the locker 62 in response to the ABS and/or the SCS being activated to allow independent rotation of the driven wheels 24. The controller 42 may be programmed to re-energize the locker 62 when the ABS and/or SCS event ends. The ABS and SCS events may be activated and deactivated within a very short time window. This time window may be shorter than the required disengagement time of the locker. This leads to the differential 26 attempting to re-engage a partially engaged locker 62. Re-engaging a partially engaged locker 62 may cause damage to the teeth of the locker 62 and/or the side gear 52. To avoid this, the controller 42 may be programmed with a time delay to reduce likelihood of an engagement command being issued before the differential is fully disengaged. The time delay may be a predetermined calibratable value preprogrammed into the controller 42. In one or more embodiments, the time delay may have a value between 0.5 to 2 seconds, inclusive.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
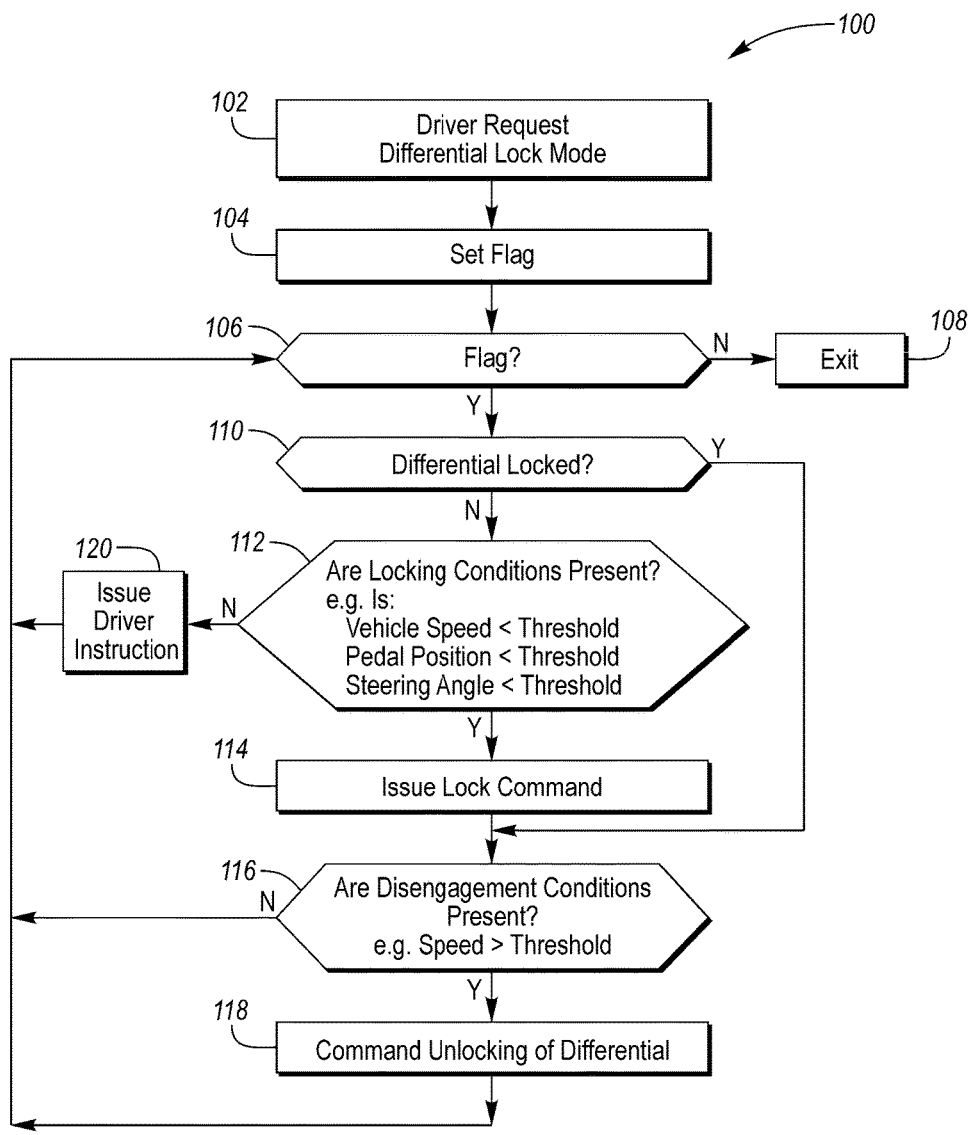
FIG. 4 is a flow chart illustrating an algorithm for controlling a differential.

FIG. 4 is a flowchart 100 of an algorithm for controlling operation of the locker 62. The algorithm begins at operation 102 when the driver requests locking of the differential i.e., the vehicle is placed in differential-lock mode. The driver (or a passenger) may request differential-lock mode by actuating the activation mechanism. At operation 104, the controller sets a flag in response to receiving the request to lock the differential. At operation 106, the controller determines if a flag is present. If no, control passes to operation 108 and differential-lock mode is exited. (The flag may be active until the driver again actuates the activation mechanism.) If yes, control passes to operation 110 and the controller determines if the differential is currently locked. If the differential is not currently locked at operation 110, control passes to operation 112 and the controller determines if locking conditions are present. For example, the controller may determine that a vehicle speed is less than a threshold, accelerator pedal position is less than a threshold, and steering angle is less than a threshold. If all these conditions are satisfied, control passes to operation 114 and the controller issues a lock command to the differential. The lock command may include sending power to the coil in order to engage the locker.

Once locked, the differential is monitored for disengagement conditions. The algorithm 100 includes operation 116 for monitoring if disengagement conditions are present. The disengagement conditions may include vehicle speed exceeding a threshold. If disengagement conditions are present at operation 116, control passes to operation 118 and the differential is commanded to unlock. The differential may be commanded to unlock by the de-energizing the coil allowing the return spring to disengage the locker.

Following unlocking of the differential, control loops back to operation 106, and if the flag is still present, the controller will attempt to automatically re-engage the locker. The entry conditions of operation 112 include comparing the steering angle to a threshold and preventing locking of the differential if the steering angle exceeds the threshold. Thus, unlike previous designs, the controller is programmed to prevent automatic re-engagement of the differential even if the vehicle speed is less than the speed threshold. This reduces the likelihood of the above described ratcheting.

If the steering angle exceeds the threshold at operation 112, control passes to operation 120 and the controller issues instructions/alerts to the driver to straighten the wheels so that the differential may be locked. The instruction may be a textual message shown on a display, e.g., display 46 or other visual indicator, or may be auditory or haptic, e.g., seat vibrations. Once the driver straightens the wheels, the differential is locked assuming the flag is still present at operation 106 and the other entry conditions are satisfied at operation 112.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle comprising:
   a differential including an electronic locker; and
   a controller programmed to, when in differential-lock mode,
      engage the locker responsive to vehicle speed being less than a speed threshold and a parameter indicative of steering angle being less than a threshold,
      disengage the locker responsive to vehicle speed exceeding the speed threshold,
      prevent automatic re-engagement of the locker responsive to the parameter exceeding the threshold, and
      issue a driver alert, requesting straightening of the steering shaft, in response to the parameter exceeding the threshold.

2. The vehicle of claim 1, wherein the controller is further programmed to prevent automatic re-engagement of the locker further responsive to an accelerator-pedal position exceeding a threshold.

3. The vehicle of claim 1 further comprising a steering system including a sensor, wherein the parameter is a signal output from the sensor.

4. The vehicle of claim 1, wherein the speed threshold is between 15 and 30 miles per hour, inclusive.

5. The vehicle of claim 1 further comprising a display, and wherein the controller is further programmed to command the display to show an alert in response to the parameter exceeding the threshold.

6. The vehicle of claim 1 further comprising a steering shaft and the parameter includes an angle of the steering shaft.

7. A vehicle comprising:
   a differential including an electronic locker; and
   a controller programmed to,
      responsive to the locker being engaged and vehicle speed exceeding a speed threshold, command disengagement of the locker, and
      responsive to the locker being disengaged, differential-lock mode being requested, vehicle speed being below the speed threshold, and a parameter indicative of a steering angle exceeding a threshold, (i) prevent automatic re-engagement of the locker and (ii) issue a driver alert.

8. The vehicle of claim 7, wherein the issue a driver alert includes requesting straightening of wheels.

9. The vehicle of claim 7 further comprising a display, and wherein the controller is further programmed to command the display to show the driver alert.

10. The vehicle of claim 7 further comprising an activation mechanism in electric communication with the controller, wherein differential-lock mode is requested by a user via the activation mechanism.

11. The vehicle of claim 7 further comprising a steering system including a sensor configured to output the parameter.

12. The vehicle of claim 7 further comprising a steering system including a steering shaft and a sensor configured to measure rotation of the steering shaft, wherein the parameter is a signal output by the sensor.

13. The vehicle of claim 12, wherein the parameter is indicative of an angular position of front wheels of the vehicle.

14. The vehicle of claim 6, wherein the speed threshold is between 15 and 30 miles per hour, inclusive.

15. A method of controlling an electronic-locking differential comprising:
   disengaging the electronic-locking differential responsive to the differential being engaged and vehicle speed exceeding a speed threshold;
   preventing automatic re-engagement of the differential responsive to the differential being disengaged, differential-lock mode being requested, vehicle speed being below the speed threshold, and a parameter indicative of steering angle exceeding a threshold; and
   displaying an alert to a driver in response to the parameter exceeding the threshold and the differential-lock mode being requested.

16. The method of claim 15, wherein the alert includes instructions to straighten wheels.

* * * * *